United States Patent
Obenland et al.

[15] 3,674,853
[45] July 4, 1972

[54] SULFUR-CONTAINING CARBORANE DERIVATIVES AND THE METHOD OF PREPARATION

[72] Inventors: Clayton O. Obenland, Williamsville, N.Y.; Stelvio Papetti, Leominster, Mass.; Hampton D. Smith, Jr., Anaheim, Calif.

[73] Assignee: Olin Corporation

[22] Filed: Sept. 25, 1970

[21] Appl. No.: 75,701

Related U.S. Application Data

[63] Continuation-in-part of Ser. No. 554,151, May 31, 1966, abandoned.

[52] U.S. Cl. ..........................260/606.5 B, 117/121, 44/76
[51] Int. Cl. .............................................................C07f 5/02
[58] Field of Search............................................260/606.5 B

[56] References Cited

UNITED STATES PATENTS

| | | | |
|---|---|---|---|
| 3,247,256 | 4/1966 | Fein et al. | 260/606.5 B |
| 3,296,260 | 1/1967 | Knoth | 260/606.5 B |
| 3,489,812 | 1/1970 | Marshall et al. | 260/606.5 B |
| 3,531,443 | 9/1970 | Papetti et al. | 260/606.5 B |

*Primary Examiner*—Tobias E. Levow
*Assistant Examiner*—Werten F. W. Bellamy

*Attorney*—Gordon D. Byrkit, Donald F. Clements, F. A. Iskander and Thomas P. O'Day

[57] ABSTRACT

This invention relates to compounds of the formula:

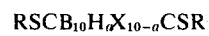

wherein R is selected from the group consisting of hydrogen, alkyl having from 1 to 18 carbon atoms, and the radical:

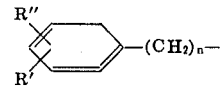

wherein R' and R" are independently selected from the group consisting of hydrogen and alkyl having from 1 to 5 carbon atoms, and $n$ is an integer from 0 to 1 inclusive; X is selected from the group consisting of chlorine, bromine and iodine, and $a$ is an integer from 0 to 10 inclusive and to the method of preparing such compounds. It also relates to the metallothiocarboranes having the general formula:

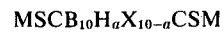

wherein M is an alkali metal selected from the group consisting of sodium, lithium and cesium and X and $a$ are as previously defined. These compounds find utility as aircraft gas turbine fuels and wood preservers.

21 Claims, No Drawings

SULFUR-CONTAINING CARBORANE DERIVATIVES AND THE METHOD OF PREPARATION

This application is a continuation-in-part of application Ser. No. 554,151, filed May 31, 1966, and now abandoned.

This invention relates to sulfur-containing carborane compounds and to processes for the preparation thereof. More specifically, it relates to compounds having the following general formula:

$$RSCB_{10}H_aX_{10-a}CSR \qquad I$$

wherein R is selected from the group consisting of hydrogen, alkyl having from one to 18 carbon atoms, and the radical:

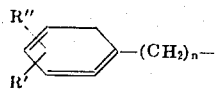

wherein R' and R" are independently selected from the group consisting of hydrogen and alkyl having from one to five carbon atoms, and $n$ is an integer from 0 to 1 inclusive; X is selected from the group consisting of chlorine, bromine and iodine; and $a$ is an integer from 0 to 10 inclusive. In the claims and specification herein, this general formula I represents derivatives of ortho-, meta- and para-carboranes.

Sulfur-containing carboranes have never been successfully prepared prior to this invention. The decaborane anion $B_{10}H_{10}^2$ and the anion $B_{12}H_{12}^{2-}$ have been reacted with sulfur-containing ligands such as SH, $SCH_3$ and $S(CH_3)_2$, for example, see Chemical and Engineering News, Vol, 44, No. 19, May 9, 1966, page 93. However, it is known to those skilled in the art that these anions readily react with a variety of materials, unlike the carborane compounds employed in this invention.

According to one of the processes of this invention the sulfur-containing carboranes having the formula I are conveniently provided by reacting a di(alkali metal) carborane or a chlorine, bromine or iodine derivative thereof with sulfur in a substantially anhydrous polar solvent medium to provide dialkalimetallothicarboranes having the following general formula:

$$MSCB_{10}H_aX_{10-a}CSM \qquad II$$

wherein M is an alkali metal selected from the group consisting of sodium potassium, lithium and cesium and X and $a$ are as previously defined. These compounds can be isolated, if desired, by any conventional technique such as filtration. A compound having the formula II is then reacted, either in the same solvent medium, or in a similar medium when the compound has been isolated, with an organohalide to provide the sulfur-containing carboranes I, with an alkali metal halide being obtained as a by-product. Optionally, Compound II is hydrolyzed with water, dilute hydrochloric acid or dilute sulfuric acid to provide the sulfur-containing carborane I where R is hydrogen.

Many of the sulfur-containing carboranes I are likewise prepared by reacting a di(alkali metal) carborane or a chlorine, bromine or iodine derivative thereof with an organodisulfide in an anhydrous polar solvent medium.

The organohalides and organodisulfides employed in the processes of this invention have the formulae RY and RS–SR respectively wherein R is as previously defined and Y is a halogen such as chlorine, bromine, iodine or fluorine. Useful disulfides include dimethyl disulfide, ethyl methyl disulfide, diethyl disulfide, di-n-propyl disulfide, isopropyl amyl disulfide, dihexyl disulfide, di-isooctyl disulfide, di-n-decyl disulfide, diphenyl disulfide, ditolyl disulfide, dixylyl disulfide, dibenzyl disulfide, etc. Illustrative of the suitable halides are methyl chloride, ethyl bromide, phenyl bromide, benzyl bromide and the like. Particularly preferred alkyl halides and disulfides are those containing from one to four carbon atoms, such as methyl bromide, dimethyl disulfide, propyl bromide, di-n-butyl disulfide and the like.

Any polar solvent may be employed in the process of this invention. The solvent must be substantially anhydrous to preclude the hydrolysis of the alkali metal prior to the reaction with the sulfur or organodisulfide. Illustrative of such solvents are ethers, such as diethyl ether, di-n-propyl ether, di-n-butyl ether, di-isopropyl ether and the like; glycol ethers such as ethylene glycol dimethyl ether, diethylene glycol di-methyl ether, dimethoxytetraethylene glycol and the like; tetrahydrofuran; dioxane and the like.

While the reactions proceed over a temperature range from about −20° C. to 150° C., a temperature between about 0° C. and 20° C. is preferred. Although stoichiometric quantities of the reactants can be employed, excess amounts of all reactants with respect to the di(alkali metal) carborane employed as the starting material are preferably employed. Compound I is then isolated by conventional techniques, such as separation, evaporation, etc. If desired, Compound I can be recrystallized from a wide variety of solvents such as petroleum ether, benzene, hexane, ethyl ether and the like.

The di(alkali metal) carboranes and derivatives thereof utilized in the preparation of Compound II are known compounds which are provided by the process described in U.S. Pat. No. 3,148,219 and have the formula:

$$MCB_{10}H_aX_{10-a}CM \qquad III$$

wherein M, X and $a$ are as previously defined.

Ortho-carborane, meta-carborane and para-carborane as well as derivatives thereof can be employed as starting materials to provide Compound III.

In FIG. 1, the structural formula of ortho-carborane, which may also be designated by the formula:

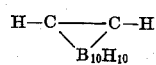

is shown as A; the structural formula of meta-carborane, (sometimes called neocarborane) which may also be designated by the formula:

$$HCB_{10}H_{10}CH$$

is shown in B in FIG. 1 while the structural formula of paracarborane is shown as C in FIG. 1.

For example, Compound III having the name 1,2-dilithio-o-carborane can be formed by reacting o-carborane with n-butyl lithium in the presence of diethyl ether. Useful di(alkali metal) -o-carboranes include 1,2-dilithio-B-chloro-o-carborane, 1,2-dilithio-B-dibromo-o-carborane, 1,2-dilithio-B-dichloro-o-carborane, 1,2-dilithio-B-iodo-o-carborane, 1,2-dilithio-B-tribromo-o-carborane, 1,2-dilithio-B-decachloro-o-carborane, etc., and the corresponding sodium, cesium and potassium compounds. The corresponding m-carborane (i.e., meta-carborane) and the corresponding p-carborane (i.e. para-carborane) derivatives, which can also be prepared in the same manner as described in U.S. Pat. No. 3,148,219, can likewise be utilized as starting materials.

The chlorine, bromine and iodine derivatives of ortho-, meta- and para-carborane can be prepared by the methods set forth in Heying and Schroeder application Ser. No. 414,947, filed Nov. 27, 1964 and in Schroeder and Smith application Ser. No. 379,859, filed July 2, 1964. For example, B-tetrachloro-o-carborane may be prepared by reacting gaseous chlorine with o-carborane in carbon tetrachloride and under ultraviolet irradiation.

Ortho-carborane (i.e., o-carborane), useful as a starting material in the processes of this invention, can be conveniently prepared by the process set forth in application Ser. No. 741,967, filed June 13, 1958, of Ager, Heying and Mangold. In the process described therein compounds of the o-carborane type can be prepared by the reaction of decaborane with acetylene in the presence of a wide variety of ethers, nitriles and amines. For example, the compound o-carborane, which can be represented by the formula:

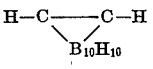

can be prepared by reacting for about 12 hours at 125° C. a mixture of decarborane and tetrahydrofuran in an autoclave pressured at 100 psi with acetylene.

Meta-carborane can be prepared by heating ortho-carborane in a sealed tube at a temperature above 400° C. for about five to 20 hours. If ortho-carborane, meta-carborane, or a mixture thereof is heated in a pressure bomb at a temperature of from about 550° C. to about 630° C. for about one to 30 hours or more, para-carborane is obtained.

The novel solid compounds of this invention which do not contain halogen are useful as fuels and when incorporated with suitable oxidizers, such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse; appreciable increases in performance will result from the use of higher specific impulse materials. The fuels of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The halogen-free boron-containing solid materials produced by practicing the method of this invention can be employed as ingredients of solid propellant compositions in accordance with general procedures which are well-understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose of doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus in manufacturing a suitable propellant, proper proportions of finely divided oxidizer and finely divided boron-containing material can be admixed with a high solids content solution of a partially condensed urea-formaldehyde or phenol-formaldehyde resin, the proportions being such that the amount of the resin is about five to ten percent by weight, based upon the weight of the oxidizer and boron compound. The ingredients are thoroughly mixed with simultaneous removal of the solvent, and the following this the solvent-free mixture is molded into the desired shape, as by extrusion. Thereafter the resin can be cured by resorting to heating at moderate temperatures. For further information concerning the formulation of solid propellant compositions, reference is made to U.S. Pat. No. 2,622,277 to Bonnel et al and U.S. Pat. No. 2,646,596 to Thomas et al.

The liquid products of our invention which do not contain any halogen substituents can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of halogen-free liquid boron compound of the present invention and hydrocarbon fuel present in the mixture, and consistent with the air dilution required to maintain the gas temperatures of these mixtures within accepted turbine operating temperatures.

Because of their high chemical reactivity and heating values, the halogen-free liquid products of our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The halogen containing boron-compounds of this invention, both liquid and solid, are useful in the preservation of wood for railroad ties, fence posts and in general for all wood utilized outdoors. For example, from about 0.5 to about five per cent by weight of 1,7-bis(ethylthio)-m-carborane can be dissolved or slurried in creosote, benzene, etc. and utilized in the typical wood treatment processes. Generally, the process employed is to heat the wood in order to drive out moisture and air, apply a vacuum to the containing chamber in order to free the pores of the wood and then send in the hot creosote containing the boron compound, under gradually rising pressure.

The following examples will serve to illustrate the practice of this invention.

EXAMPLE I a slurry of 1,7-dilithio-m-carborane (LiCB$_{10}$H$_{10}$CLi) (0.174 mole) in ether (200 ml.) was prepared in a 500 ml., three-necked flask under an atmosphere of nitrogen. The slurry was cooled in an ice bath with rapid stirring. When the temperature of the slurry decreased to 5° C., the addition of 11.7 grams of powdered sulfur (0.366 moles) through a solid addition funnel was begun. The rate of addition was adjusted to maintain a reaction mixture temperature below 10° C. After the addition was completed, the mixture was kept at 10° C. for one hour, and then allowed to warm slowly to ambient temperature. The reaction mixture was stirred for 16 hours. Hydrochloric acid (200 ml. of a 20 percent solution) was added to the reaction mixture. After a few minutes, two liquid phases was observed. The layers were separated in a separatory funnel and the ether layer dried over anhydrous magnesium sulfate. The ether was removed in vacuum, leaving a yellow solid. This material was placed in a sublimator and sublimed at 100°–140° C. The resulting crystals were recrystallized from aqueous ethanol to provide 7.1 grams of white crystals melting at 164°–165° C. The following analytical data revealed that 1,7-bis(thio)-m-carborane having the formula:

$$HSCB_{10}H_{10}CSH$$

had been obtain. Mass spectroscopy and nuclear magnetic resonance analysis confirmed the structure.

Yield: 60.0%

| Anal. Calc'd for C$_2$H$_{12}$B$_{10}$S$_2$: | C, 11.53; H, 5.76; B, 51.90; S, 30.80. |
|---|---|
| Found: | C, 11.90; H, 6.00; B, 53.11; S, 29.11. |

The structural formula of the compound 1,7-bis(thio)-m-carborane is the same as structural formula B in FIG. 1 except that the hydrogen atoms designated by the single and double asterisks are each replaced by —SH.

EXAMPLE 2

Following the procedure of Example 1, 35 grams of powdered sulfur (1.1 moles) were added to 1,2-dilithio-o-carborane (0.5 moles) in a slurry of ether (500 ml.) at 5° C. The resulting yellow solution was stirred for one hour. During this period, a white solid separated from the solution. The reaction mixture was then hydrolyzed with hydrochloric acid (350 ml. of 15 per cent solution) and the ether layer separated and dried following the procedure of Example 1. After evaporation of the ether, the white solid material was recrystallized from petroleum ether at a temperature range from about 30° to 60° C. and sublimed at 180° C. and 0.5 mm. Hg to provide 100 grams of white crystals melting at 265-267°C. The following analytical data revealed that 1,2-bis(thio)-o-carborane having the formula:

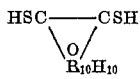

had been obtained. Mass spectral analysis confirmed the structure.

Yield: 96.0%

Anal. Calc'd for $C_2H_{12}B_{10}S_2$:  C, 11.53; H, 5.76; B, 51.90; S, 30.80
Found:  C, 11.77; H, 5.80; B, 51.91; S, 29.98

The structural formula of the compound 1,2-bis(thio)-o-carborane is the same as structural formula A in FIG. 1 except that the hydrogen atoms designated by the single and double asterisks are replaced by —SH.

EXAMPLE 3

Following the procedure of Example 1, 6.4 grams of powdered sulfur (0.2 moles) were reacted with 1,2-dilithio-B-bromo-o-carborane (0.1 moles) in a slurry of ether (200 ml.). After hydrolysis and purification, about 14 grams of tan-colored crystals melting at 138°–140°C. were obtained. Mass spectroscopy and infrared analysis revealed that 1,2-bis(thio)-B-bromo-o-carborane having the formula:

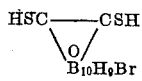

had been obtained.

EXAMPLE 4

Following the procedure of Example 1, 1.26 grams of powdered sulfur (0.39 moles) were reacted with 7.5 grams 1,2-dilithio-B-tribromo-o-carborane (0.0197 mole) in a slurry of ether (100 ml.). After hydrolysis and purification, crystals melting at 203°–206° C. were obtained. Mass spectroscopy and infrared analysis revealed that 1,2-bis-(thio)-B-tribromo-o-carborane having the formula:

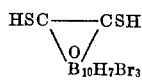

had been obtained.

EXAMPLE 5

1,2-dilithio-o-carborane (0.1 moles) in a slurry of ether (200 ml.) was reacted with 6.4 grams of powdered sulfur, following the procedure of Example 1. A solution of methyl iodine (28.4 grams) in ether (100 ml.) was added with stirring, maintaining a temperature of 20° C. The resulting yellow solution was evaporated to dryness. The residue was washed with water, dried over anhydrous magnesium sulfate and then recrystallized from petroleum ether at a temperature of about 30°–60 C. to provide 21 grams of yellow solid melting at 101-102° C. Mass spectroscopy and infrared analyses revealed that 1,2-bis-methylthio)-o-carborane having the formula:

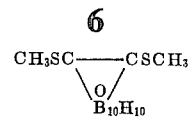

had been obtained.

EXAMPLE 6

A suspension of 1,2-dilithio-B-dibromo-o-carborane (0.05 moles) was prepared in a slurry of ether (150 ml.). A solution of dimethyl disulfide (9.4 grams) in ether (150 ml.) was added with stirring at a temperature of 5° C. After isolation and purification following the procedure of Example 5, a solid melting at 181°–183° C. was obtained. The following analytical data revealed that 1,2-bis(methylthio)-B-dibromo-o-carborane having the formula:

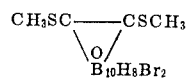

had been obtained. Infrared analysis and mass spectroscopy confirmed the structure.

Anal. Calc'd for $C_4H_{14}B_{10}Br_2S_2$:  C,12.20; H, 3.55; B, 27.40; Br, 40.60; S, 16.25
Found:  C, 12.38; H, 3.69; B, 27.43; Br, 41,0; S, 16.05

EXAMPLE 7

The procedure of Example 6 was followed, but a solution of diethyl disulfide (24.5 grams) in ether (100 ml.) was employed as the alkyl disulfide. After isolation and purification, a tan-colored solid melting at 95°–97° C. was obtained. The following analytical data revealed that 1,2-bis(ethylthio)-B-dibromo-o- carborane having the formula:

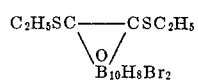

had been obtained.

Anal. Calc'd for $C_6H_{18}B_{10}Br_2S_2$:  C, 17.02; H, 4.26; Br, 37.9; S, 15.15
Found:  C, 16.74; H, 4.26; Br, 39.0; S, 14.04

EXAMPLE 8

1,2-dilithio-o-carborane (0.05 moles) in a slurry of ether (150 ml.) was prepared in a 500 ml., three-necked flask. A solution of diphenyl disulfide (21.8 grams) in ether (150 ml.), was added with stirring at a temperature of 5° C. The mixture was allowed to warm to 20° C. and was hydrolyzed with 100 ml. of water. The ether layer was separated, dried over anhydrous magnesium sulfate, and the ether evaporated. The residue was recrystallized from petroleum ether at a temperature of 30–60° C. to provide white crystals having a melting point of 189°–191° C. The following analytical data revealed that 1,2-bis(phenylthio)-o-carborane having the formula:

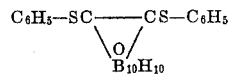

had been obtained. Infrared analysis and mass spectroscopy confirmed the structure.

Anal. Calc'd for $C_{14}H_{20}B_{20}S_2$:  C, 46.60; H, 5.55; B, 30.00; S, 17.85
Found:  C, 46.42; H, 5.46; B, 30.03; S, 17.80

EXAMPLE 9

A suspension of 1,2-dilithio-o-carborane (0.05 moles) in ether (250 ml.) was charged to 500 ml., 2-necked reaction flask. To this suspension was added a solution of 9.4 grams of methyl disulfide (0.1 mole) in ether (150 ml.). The reaction mixture was stirred for 30 minutes. Water (50 ml.) was added and the mixture shaken. After a few minutes, the mixture separated into two liquid phases. The layers were separated in a separatory funnel and the ether layer dried over magnesium sulfate. After evaporation of the ether, a tan solid was obtained. It was recrystallized from petroleum ether at a temperature of 30°–60° C. to provide 8.0 gms of white crystals melting at 101°–102° C. The following analytical data revealed that 1,2-bis(methylthio)-o-carborane having the formula:

$$CH_3SC\underset{B_{10}H_{10}}{\overset{O}{\diagdown\diagup}}CSCH_3$$

had been obtained. Infrared analysis and mass spectroscopy confirmed the structure.
Yield: 70.0%

Anal. Calc'd for $C_4H_{16}B_{10}S_2$:    C, 20.35; H, 6.79;
                                             B, 45.70; S, 27.10
                 Found:    C, 20.62; H, 6.92;
                                             B, 45.83; S, 26.98

EXAMPLE 10

Following the procedure of Example 1, 49.28 grams of benzyl disulfide were reacted with 1,2-dilithio-o-carborane (0.2 moles) in s solution of ether (120 ml.). After isolation and purification, 20.0 grams of white crystals melting at 120°–104° C. were obtained The following analytical data revealed that 1,2-bis(benzylthio)-o-carborane having the formula:

$$C_6H_5-CH_2-SC\underset{B_{10}H_{10}}{\overset{O}{\diagdown\diagup}}CS-CH_2-C_6H_5$$

had been obtained. Infrared analysis and mass spectroscopy confirmed the structure.
Yield: 50.0%

Anal. Calc'd for $C_{16}H_{24}B_{10}S_2$:    C, 49.50; H, 6.18;
                                          B, 27.80; S, 16.50
                  Found:    C, 49.50; H, 6.23;
                                             B, 27.94; S, 16.50

EXAMPLE 11

A slurry of 1,7-dilithio-m-carborane (.0203 moles) in ether (150 ml.) was cooled to 5° C. To the cooled slurry was added 10 grams of p-tolyldisulfide (.0406 mole). The reaction mixture was stirred for two hours, while allowing the temperature to increase slowly to 25° C. Water (150 ml.) was added and the resulting layers separated. The ether layer was dried over magnesium sulfate, filtered and evaporated to provide 8.1 grams of a light yellow solid which was recrystallized from ethyl ether, yielding 5.0 grams of a white crystalline solid melting at 131°–132° C. The following analytical data revealed that 1,7-bis(p-tolylthio)-m-carborane having the formula:

$$CH_3C_6H_4SCB_{10}H_{10}CSC_6H_4CH_3$$

had been obtained.
Yield: 65.0%

Anal. Calc'd for $C_{16}H_{24}B_{10}S_2$:    C, 49.45; H, 6.17;
                                         B, 27.88; S, 16.50
                  Found:    C, 49.68; H, 6.30;
                                           B, 27.75; S, 16.32.

EXAMPLE 12

A solution of 12.2 grams of ethyl disulfide in 100 ml. of ether was added to a slurry of 1,7-dilithio-m-carborane (0.05 moles) in 300 ml. of ether. The reaction mixture was stirred for 45 minutes at room temperature and then added to a solution of mercuric chloride (27.15 grams) in water (1500 ml.). The mixture acidified with dilute hydrochloric acid, filtered, and the ether layer separated and dried over magnesium sulfate. After evaporation of the ether, a yellow oil was obtained. The oil was distilled under reduced pressure to provide 10.0 grams of a colorless liquid boiling at 114° C. at 0.01 mm. of mercury pressure. Infrared analysis, mass spectroscopy and the following analytical data revealed that 1,7-bis(ehtylthio)-m-carborane having the formula:

$$C_2H_5SCB_{10}H_{10}CSC_2H_5$$

had been obtained.
Yield: 80.0%

Anal. Calc'd for $C_6H_{20}B_{20}S_2$:    C, 27.30; H, 7.59;
                                      B, 40.91; S, 24.20.
                  Found:    C, 27.71; H, 7.88;
                                          B, 40.35; S, 24.91.

What is claimed is:

1. A compound selected from the group consisting of derivatives of ortho-, meta- and para-carboranes having the formula:

$$RSCB_{10}H_aX_{10-a}CSR$$

wherein R is selected from the group consisting of hydrogen, alkyl having from one to 18 carbon atoms, and radical: radical;

$$\underset{R'}{\overset{R''}{\diagdown}}\!\!\!\!\!\!\!\!\diagup\!\!\!\diagdown\!\!\!\!\!\!\!\!\diagup\!\!\!\!\!\!\!\!\!-(CH_2)_n-$$

wherein R' and R'' are independently selected from the group consisting of hydrogen and alkyl having from one to five carbon atoms, and $n$ is an integer from 0 to 1 inclusive; X is selected from the group consisting of chlorine, bromine and iodine; and $a$ is an integer from 0 to 10 inclusive.

2. The compound of claim 1 wherein the carborane is the meta isomer, each R is hydrogen and $a$ is 10.
3. The compound of claim 1 wherein the carborane is the ortho isomer, each R is hydrogen and $a$ is 10.
4. The compound of claim 1 wherein the carborane is the ortho isomer, each R is hydrogen, X is bromine and $a$ is 9.
5. The compound of claim 1 wherein the carborane is the ortho isomer, each R is hydrogen, X is bromine and $a$ is 7.
6. The compound of claim 1 wherein the carborane is the ortho isomer, each R is methyl and $a$ is 10.
7. The compound of claim 1 wherein the carborane is the ortho isomer, each R is methyl, X is bromine and $a$ is 8.
8. The compound of claim 1 wherein the carborane is the ortho isomer, each R is ethyl, X is bromine and $a$ is 8.
9. The compound of claim 1 wherein the carborane is the ortho isomer, each R is phenyl and $a$ is 10.
10. The compound of claim 1 wherein the carborane is the ortho isomer, each R is benzyl and $a$ is 10.
11. The compound of claim 1 wherein the carborane is the meta isomer, each R is p-tolyl and $a$ is 10.
12. The compound of claim 1 wherein the carborane is the meta isomer, each R is ethyl and $a$ is 10.
13. A compound selected from the group consisting of derivatives of ortho-, meta- and para-carboranes having the formula:

$$MSCB_{10}H_aX_{10-a}CSM$$

wherein M is an alkali metal selected from the group consisting of sodium, lithium, potassium and cesium; X is selected from the group consisting of chlorine, bromine and iodine; and $a$ is an integer from 0 to 10 inclusive.

14. A process for preparing the compound of claim 1 which comprises reacting a compound selected from the group consisting of dialkali metallo ortho-, meta- and para-carboranes having the formula:

$$MCB_{10}H_aX_{10-a}CM$$

wherein M is an alkali metal selected from the group consisting of sodium, potassium, lithium and cesium; X is selected from the group consisting of chlorine, bromine and iodine; and $a$ is an integer from 0 to 10 inclusive; with sulfur in a substantially anhydrous polar solvent medium at a temperature between about −20° C. to 150° C., thereby providing a dialkali metallothiocarborane having the formula:

$$MSCB_{10}H_aX_{10-a}CSM$$

wherein M, X and $a$ are as previously described, and then reacting said dialkali metallothiocarborane with a material selected from the group consisting of water, dilute hydrochloric acid, dilute sulfuric acid and an organohalide having the formula:

$$RY$$

wherein R is selected from the group consisting of alkyl having from one to 18 carbon atoms, and the radical:

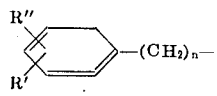

wherein R' and R'' are independently selected from the group consisting of hydrogen and alkyl having from one to five carbon atoms, and $n$ is an integer from zero to one inclusive; and Y is a halogen selected from the group consisting of chlorine, bromine, iodine and fluorine.

15. The process of claim 14 wherein the said dialkali metallocarborane is 1,2-dilithio-o-carborane, the said polar solvent medium is diethyl ether, and the said material is dilute hydrochloric acid.

16. A process for preparing the compound of claim 1 which comprises reacting a compound selected from the group consisting of dialkali metallo ortho-, meta- and para-carboranes having the formula:

$$MCB_{10}H_aX_{10-a}CM$$

wherein M is an alkali metal selected from the group consisting of sodium, potassium, lithium and cesium; X is selected from the group consisting of chlorine, bromine, and iodine; and $a$ is an integer from 0 to 10 inclusive, with an organodisulfide having the formula:

$$RS-SR$$

wherein R is selected from the group consisting of alkyl having from one to 18 carbon atoms, and the radical:

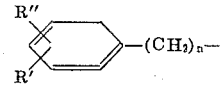

wherein R' and R'' are independently selected from the group consisting of hydrogen and alkyl having from one to five carbon atoms, and $n$ is an integer from 0 to 1 inclusive; in a polar solvent medium at a temperature between about $-20°$ C. and $150°$ C.

17. The process of claim 16 in which a temperature between about $0°$ C. and about $20°$ C. is employed.

18. The process of claim 16 wherein M is lithium, $a$ is ten and R is methyl.

19. The process of claim 16 wherein M is lithium, $a$ is 10 and R is benzyl.

20. The process of claim 16 wherein M is lithium, $a$ is 10 and R is phenyl.

21. The process of claim 16 wherein M is lithium, $a$ is 8, X is bromine and R is methyl.

* * * * *